United States Patent
Border et al.

(10) Patent No.: US 9,985,874 B2
(45) Date of Patent: May 29, 2018

(54) NETWORK TRAFFIC SPLIT AMONG MULTIPLE PATHS

(71) Applicant: Hughes Network Systems, LLC, Germantown, MD (US)

(72) Inventors: John Border, Middleton, MD (US); Robert Torres, New Market, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 232 days.

(21) Appl. No.: 14/872,173

(22) Filed: Oct. 1, 2015

(65) Prior Publication Data
US 2017/0099214 A1 Apr. 6, 2017

(51) Int. Cl.
*H04J 3/24* (2006.01)
*H04L 12/707* (2013.01)
*H04W 88/06* (2009.01)
*H04W 48/18* (2009.01)
*H04L 12/865* (2013.01)
*H04W 28/06* (2009.01)

(52) U.S. Cl.
CPC .......... *H04L 45/24* (2013.01); *H04L 47/6275* (2013.01); *H04W 48/18* (2013.01); *H04W 88/06* (2013.01); *H04W 28/065* (2013.01)

(58) Field of Classification Search
CPC ......... H04B 1/707; H04L 25/14; H04L 29/06; H04L 45/24; H04L 69/16; H04L 69/22; H04L 69/168; H04L 47/6275; H04W 28/065; H04W 48/18; H04W 88/06
USPC ............... 370/389, 401, 419, 432, 252, 474; 455/414.4
See application file for complete search history.

(56) References Cited

U.S. PATENT DOCUMENTS

| | | | |
|---|---|---|---|
| 6,240,073 | B1 | 5/2001 | Reichman et al. |
| 7,085,247 | B2 | 8/2006 | Schweinhart et al. |
| 2002/0131425 | A1* | 9/2002 | Shalom .................. H04L 29/06 370/401 |
| 2010/0098245 | A1* | 4/2010 | Fang ...................... H04B 1/707 380/38 |
| 2012/0196579 | A1* | 8/2012 | Souissi .................. H04L 25/14 455/414.4 |

* cited by examiner

*Primary Examiner* — Harun Chowdhury
(74) *Attorney, Agent, or Firm* — Bejin Bieneman PLC (57) ABSTRACT

A transmitter includes a buffer programmed to queue packets and a computing device having a processor and a data storage medium. The computing device is programmed to generate at least two sub-packets from each of the plurality of packets stored in the queue. For each sub-packet, the computing device is programmed to identify a plurality of transmission opportunities. Each transmission opportunity is associated with one of a plurality of networks. The computing device is further programmed to select among the plurality of transmission opportunities and transmit the sub-packet over the network associated with the selected transmission opportunity.

17 Claims, 4 Drawing Sheets

NETWORK TRAFFIC SPLIT AMONG MULTIPLE PATHS

BACKGROUND

Wireless communication protocols include Time Division Multiple Access (TDMA), Code Division Multiple Access (CDMA), and Scrambled Coded Multiple Access (SCMA), among others. TDMA generally allows multiple terminals to communicate with a receiver at a particular frequency but at different times to avoid or minimize interference. CDMA generally allows multiple terminals to communicate with a receiver over a single channel using a spread-spectrum technique and coding scheme. SCMA involves allowing different terminals, sharing a bandwidth, to communicate with a receiver by using specific scrambling sequences.

DETAILED DESCRIPTION

Some traffic-splitting telecommunications systems operate on a per packet basis, meaning that packets can be transmitted on different network paths, even when the paths share the same physical medium, but the contents of an individual packet are transmitted on the same network path. Since the contents of the packet are transmitted on the same network path, the later-sent portions of the packet are subject to the network capacity decisions made at the time the first portion of the packet was sent. Therefore, if network conditions change mid-packet (i.e., while subsequent portions of the packets are being sent), there is no way for the remainder of the packet to be sent over a different network path, even though a different network path might make more sense for, e.g., improved latency, etc. This is especially true for large packets.

One way to address this issue is for traffic to be split at arbitrary boundaries within packets sent via multiple link access methods within the same physical medium. It could also be used to transmit over different physical mediums as long as the receiver can receive all of the fragments. Allowing fragments (i.e., also referred to as portions or sub-packets of an individual packet) to be transmitted over different network paths means that each fragment will be transmitted over the network path that makes the most sense, thereby improving latency performance and potentially having other benefits. Accordingly, when a packet is ready to be transmitted, the fragments can be sent via whichever link access method transmit opportunity occurs first and without regard to whether or not the entire packet will fit within the transmit opportunity.

In order to be transmitted across a physical medium, e.g., an inroute, packets are often broken down and packed into physical layer transmission units, e.g., bursts. When multiple physical medium options exist at the same time, for example, TDMA Aloha and TDMA stream or TDMA stream and SCMA, transmit opportunities for each medium are likely to be intermixed. Without the ability to split packets across both physical mediums, once part of a packet has been sent via one option, the rest of that packet must be sent via that same option. This is true even if the next transmit opportunity is actually associated with the other option. Having to wait for a transmit opportunity for the original option adds latency to the delivery of the packet. The other medium might be used to carry another packet to avoid wasting the transmission opportunity but doing so introduces the possibility of increasing latency due to out-of-order packet delivery. Plus, the sending of the new packet may introduce latency for that packet if it cannot be completely sent prior to the next transmission opportunity for the original option. One way to eliminate this latency impact (and eliminate the need to deal with trying to solve the efficiency problem with out-of-order delivery handling complexity) includes allowing parts of the same packet to be sent over different mediums, in the order of the transmission opportunities.

An example transmitter that can be used to split traffic among multiple paths includes a buffer programmed to queue packets and a computing device having a processor and a data storage medium. The computing device is programmed to generate sub-packets from each of the packets stored in the queue. For each sub-packet, the computing device is programmed to identify multiple transmission opportunities. Each transmission opportunity is associated with one of a plurality of networks. The computing device is further programmed to select among the plurality of transmission opportunities and transmit one of the generated sub-packets over the network associated with the selected transmission opportunity. When it is time to send the next sub-packet, the computing device evaluates the present transmission opportunities and sends the next sub-packet according to the network associated with the present transmission opportunity.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
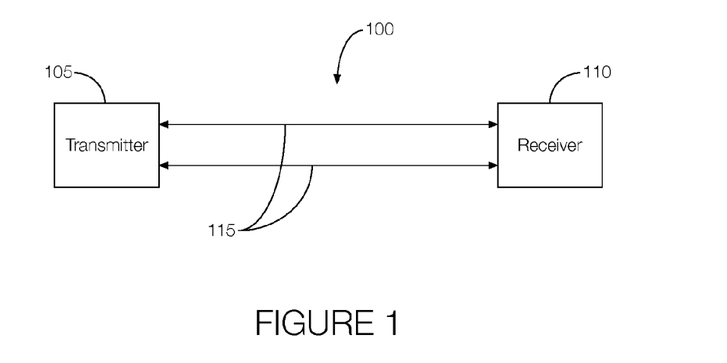
FIG. 1 illustrates an example telecommunications system that splits network traffic among multiple network paths.

As illustrated in FIG. 1, the telecommunications system 100 includes a transmitter 105 in communication with a receiver 110 via multiple network paths 115. While only one transmitter 105 and receiver 110 are shown, the telecommunications system 100 may include any number of transmitters 105 in communication with any number of receivers 110. Further, only two network paths 115 are shown for purposes of simplicity, but the transmitter 105 may communicate with the receiver 110 via any number of network paths 115. Each network path may represent network communication in accordance with a different telecommunications protocol. For instance, one network path may represent communication via the scrambled coded multiple access (SCMA) protocol, another network path may represent communication via the time division multiple access (TDMA) protocol, another network path may represent communication via the code division multiple access (CDMA) protocol, etc.

Figure 2:
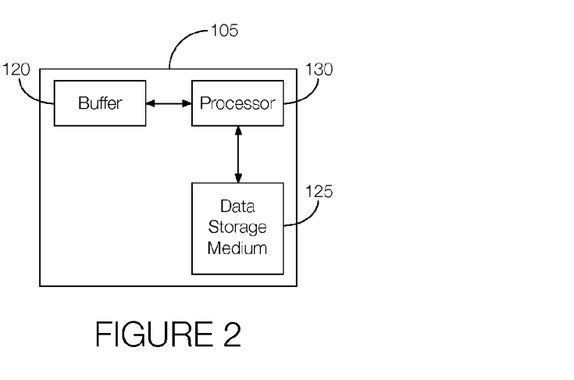
FIG. 2 is a block diagram showing example components of a transmitter used in the telecommunications system of FIG. 1.

Referring to FIGS. 1 and 2, the transmitter 105 (simplified for purposes of illustration and clarity) may include any electronic device having at least one circuit configured or programmed to wirelessly communicate with the receiver 110 in accordance with any number of telecommunications protocols, as discussed above. The transmitter 105 may include components such as a buffer 120, a data storage medium 125, and a processor 130, among others. The buffer 120 may be programmed to queue packets. The data storage medium 125 may be programmed to store computer-executable instructions. The processor 130 may be programmed to access and execute the computer-executable instructions stored on the data storage medium 125. For instance, the processor 130 may be programmed to execute instructions that cause the processor 130 to identify multiple transmission opportunities, select among the transmission opportunities, and transmit a portion of one of the packets (e.g., a sub-packet) queued in the buffer 120 over the network associated with the selected transmission opportunity. Each transmission opportunity may be associated with one of the network paths 115, and each transmission opportunity may define a period of time at which the transmitter 105 can communicate over the particular network path. The transmission opportunities may be different for each network path, which may mean that each network path may define a different time at which the transmitter 105 can transmit over the network path, the length of time available for the transmitter 105 to transmit over the network path, the amount of data that may be transmitted over the network path, etc.

When a packet is queued in the buffer 120, the processor 130 may consider all available transmission opportunities and select the appropriate network path based on, e.g., whichever transmission opportunity is presently available. Once the transmission opportunity has been selected, the processor 130 may be programmed to select one of the packets from the buffer 120, such as the oldest packet in the buffer 120 or the packet in the buffer 120 with the highest priority, and generate multiple sub-packets (such as burst packets), from the packets queued in the buffer 120, according to the amount of data that may be transmitted over the network path in accordance with the transmission opportunity. The processor 130 may be programmed to transmit one (i.e., the first) sub-packet over the network path associated with the selected transmission opportunity. Then, the processor 130 may be programmed to reevaluate the transmission opportunities prior to sending the next sub-packet. The processor 130 may generate and send the next sub-packet (i.e., the second sub-packet) in accordance with the transmission opportunities, and associated network paths 115, that exist at the time the processor 130 is ready to send the second sub-packet. After the second sub-packet is sent, the processor 130 may once again reevaluate the transmission opportunities. In other words, the processor 130 may reevaluate the transmission opportunities prior to generating and sending each sub-packet for each packet queued in the buffer 120. Therefore, it is possible that the processor 130 may transmit sub-packets, originating from the same packet queued in the buffer 120, over different network paths 115, which as discussed above, may correspond to different telecommunications protocols.

The processor 130 may be programmed to process the queued packets in a predetermined order, such as first-in-first-out (FIFO). For instance, the processor 130 may be programmed to generate and transmit the sub-packets for the oldest packet stored in the buffer 120 before generating and transmitting sub-packets associated other queued packets. Further, the processor 130 may be programmed to transmit the sub-packets in the order in which the sub-packets are generated. Alternatively, the processor 130 may process queued packets according to a priority assigned to the queued packets. Thus, the processor 130 may determine which packet in the buffer 120 has the highest priority and select the highest-priority packet for processing. The packet with the highest priority may be processed by, e.g., converting fragments of the highest-priority packet into sub-packets and transmitting over the network paths 115 according to the available transmission opportunities, as discussed above. If multiple packets are queued with the same highest priority, the processor 130 may be programmed to process the oldest among the highest-priority packets first.

In some instances, the processor 130 may be programmed to evaluate the priority of the queued packets before sending all sub-packets associated with the next queued packet. That is, the processor 130 may begin sending sub-packets associated with a first queued packet over one of the network paths 115 when a second packet is queued in the buffer 120 (referred to as the second queued packet). The processor 130 may be programmed to evaluate the priority of the second queued packet relative to the first queued packet. If the priority of the second queued packet is higher than the priority of the first queued packet, the processor 130 may be programmed to temporarily halt processing of the first queued packet and begin processing the second queued packet. For instance, the processor 130 may be programmed to stop sending the sub-packets associated with the first queued packet and begin sending sub-packets associated with the second queued packet in accordance with the network path associated with the next transmission opportunity. Once all sub-packets associated with the second queued packet have been sent, the processor 130 may resume sending sub-packets associated with the first queued packet as long as no higher-priority packets have been queued in the meantime. Thus, subsequent sub-packets transmitted may be from different queued packets even though an entire packet has not yet been transmitted over one or more network paths 115.

Figure 3:
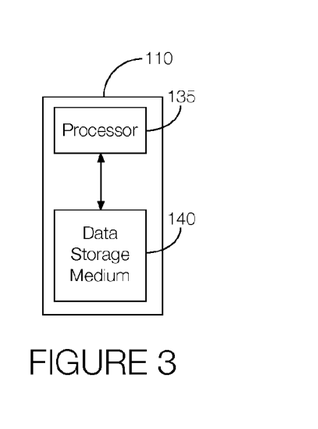
FIG. 3 is a block diagram showing example components of a receiver used in the telecommunications system of FIG. 1.

With reference to FIGS. 1 and 3, the receiver 110 (simplified for purposes of clarity and illustration) may be configured or programmed to wirelessly communicate in accordance with the telecommunication protocols associated with each of the network paths 115. The receiver 110 may include any electronic device having at least one circuit, including a processor 135 and a data storage medium 140. The processor 135 may include any computing device, which includes at least one circuit, configured or programmed to access and execute computer-executable instructions stored in the data storage medium 140. The receiver 110 may be configured or programmed to wirelessly communicate with multiple transmitters 105 via any number of network paths 115.

In one possible implementation, the receiver 110 may be programmed to receive group sub-packets transmitted from the transmitter 105. The group sub-packets received by the receiver 110 may include a first sub-packet transmitted over one network path, a second sub-packet transmitted over the same or a different network path, a third sub-packet transmitted over the same or different network paths 115 as the first and second sub-packets, and so on.

The receiver 110 may be programmed to assemble the sub-packets according to information transmitted with each sub-packet. For instance, the receiver 110 may be programmed to assemble the sub-packets based on a unique word, the group header, the burst header, the packet headers, or a combination of these headers. The receiver 110 may be further programmed to extract the payloads sub-packets and append the payloads from subsequent sub-packets until the payloads from all sub-packets associated with a particular originating packet (i.e., a packet stored in the buffer 120) have been assembled.

Figure 4:
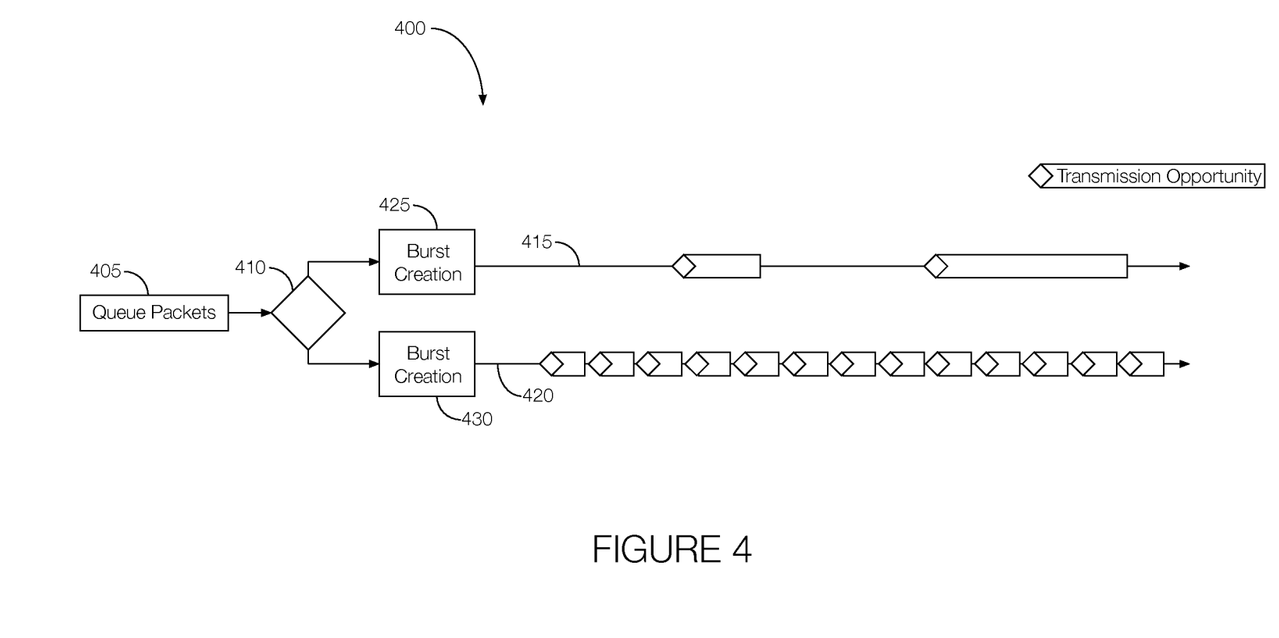
FIG. 4 is a block diagram illustrating transmitting sub-packets among multiple network paths.
Figure 5:
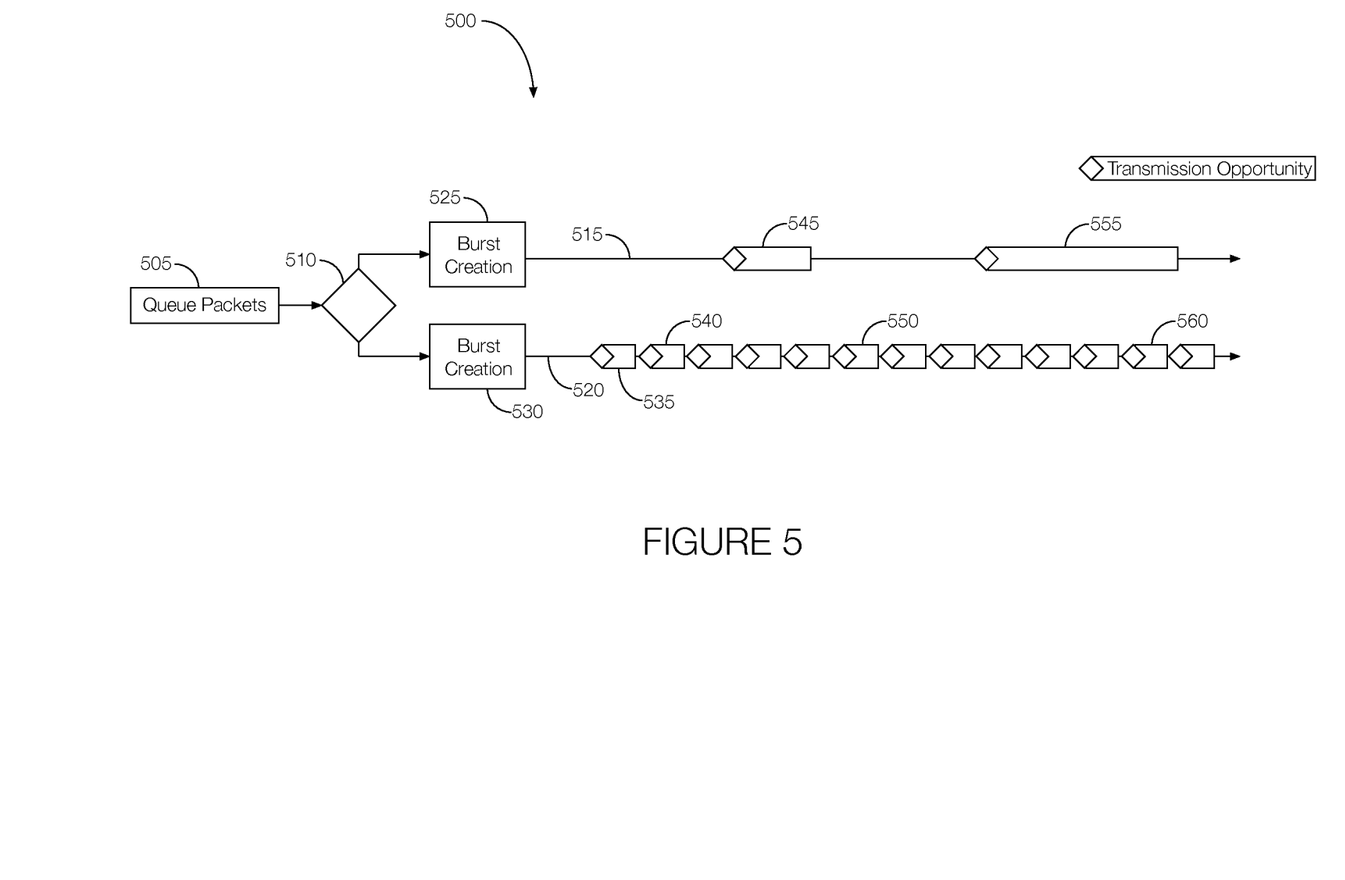
FIG. 5 is a block diagram illustrating transmitting sub-packets among multiple network paths according to a priority assigned to the sub-packets.

FIGS. 4 and 5 illustrate different scenarios for sending sub-packets over multiple network paths 115. The diagram 400 of FIG. 4 illustrates an implementation where sub-packets from the same originating packet are transmitted among different network paths 115. For purposes of simplicity, only two network paths 115 are shown. The originating packet is stored in a queue shown at block 405, and the network path is selected at decision block 410 based on the transmission opportunities available at the time. For instance, at block 410, the processor 130 of the transmitter 105 may identify available transmission opportunities (shown as diamonds attached to rectangles) and select the best transmission opportunity presently available. Thus, the outcome of the decision block 410 may include transmitting the next sub-packet over a first network path 415 or a second network path 420. If the sub-packet is to be transmitted over the first network path 415, the sub-packet may be generated, from the originating packet, at block 425 in accordance with the protocol associated with the first network path 415. If the sub-packet is to be transmitted over the second network path 420, the sub-packet may be generated, from the originating packet, at block 430 in accordance with the network protocol associated with the second network path 420. Then, at decision block 410, the processor 130 may consider the presently available transmission opportunities and select the first network path 415 or the second network path 420 for the next sub-packet to be generated from the originating packet. The transmitter 105 may continue to operate as such as long as packets remain in the queue.

The diagram 500 of FIG. 5 illustrates an implementation where sub-packets from different queued packets are transmitted among multiple network paths 115 according to a priority assigned to the queued packets. If all packets in the queue shown at block 505 have the same priority, the sub-packets may be generated and transmitted in the same way discussed above with respect to FIG. 4. If one packet arrives at block 505 with a higher priority, the higher-priority packet may be processed before the lower-priority packet at decision block 510. That is, the processor 130 of the transmitter 105 may begin to evaluate the transmission opportunities for the higher-priority originating packet even if sub-packets have already been transmitted for a lower-priority originating packet. In the example shown in FIG. 5, a first sub-packet 535, associated with a lower-priority originating packet, was transmitted over a second network path 520. Then, a higher-priority originating packet arrives at block 505. Therefore, a second sub-packet 540, associated with the higher-priority originating packet, is transmitted over the second network path 520 based on the transmission opportunities available at the time the second sub-packet is generated. Other sub-packets are then generated and transmitted from the higher-priority originating packet. One sub-packet, shown at element 545, is transmitted over the first network path and another shown at element 550 is transmitted over the second network path. The next sub-packet 555 associated with the lower-priority originating packet is generated and transmitted after all of the sub-packets associated with the higher-priority originating packet have been transmitted. In the example of FIG. 5, the next sub-packet 560 associated with the lower-priority originating packet is transmitted over the first network path 515 after the processor 130 of the transmitter 105 evaluated the transmission opportunities available when the transmitter 105 was ready to generate and send that sub-packet 560. The bursts transmitted over the first network path 515 may be generated at block 525 and the bursts transmitted over the second network path 520 may be generated at block 530.

Figure 6:
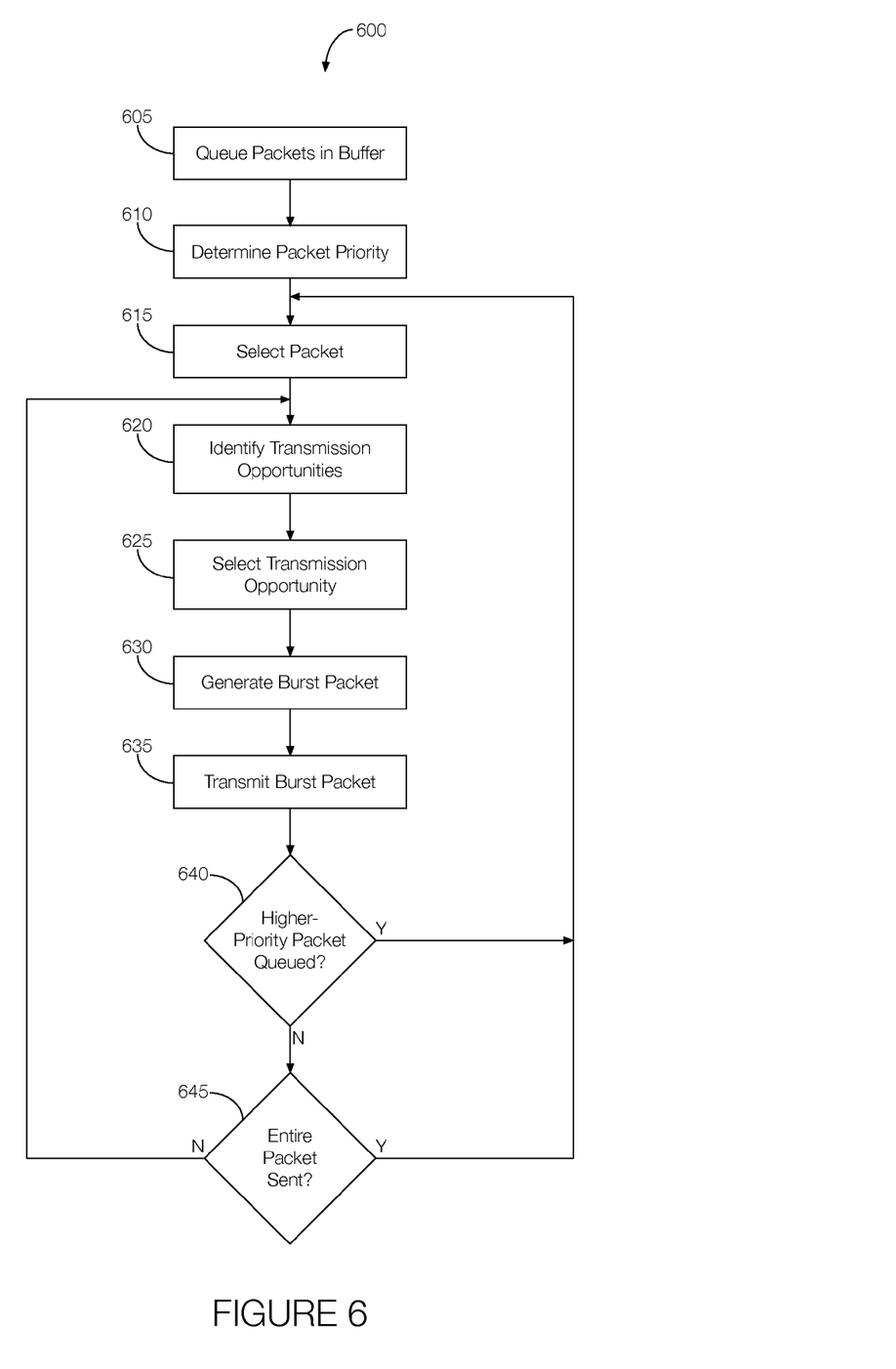
FIG. 6 is a flowchart of an example process that may be executed by the transmitter to split network traffic among multiple network paths.

FIG. 6 is a flowchart of an example process 600 that may be executed by the transmitter 105 to split network traffic among multiple network paths 115. The process 600 may be executed any time the transmitter 105 is turned on and ready to communicate over multiple network paths 115. The process 600 may continue to execute until, e.g., the transmitter 105 is turned off or otherwise disconnected from one or more network paths 115.

At block 605, the transmitter 105 may queue a packet in the buffer 120. The packet may be queued in a first-in, first-out implementation or according to a priority assigned to each packet.

At block 610, the transmitter 105 may determine the priority of the packets stored in the buffer 120. A priority may be assigned to each packet and may allow certain packets to be sent before others. That is, the processor 130 may process higher-priority packets before lower-priority packets.

At block 615, the transmitter 105 may select the packet in the queue with the highest priority. If two or more packets have the same highest priority, the processor 130 may select the packet with the highest priority that has been queued the longest in the buffer 120.

At block 620, the transmitter 105 may identify transmission opportunities presently available for sending fragments (i.e., portions) of the queued packet. Each transmission opportunity may be associated with one of the network paths 115, and each transmission opportunity may define a period of time at which the transmitter 105 can communicate over the particular network path. The transmission opportunities may be different for each network path, which may mean that each network path may define a different time at which the transmitter 105 can transmit over the network path, the length of time available for the transmitter 105 to transmit over the network path, the amount of data that may be transmitted over the network path, etc.

At block 625, the transmitter 105 may select one of the transmission opportunities. For example, the processor 130 may select the best options among the transmission opportunities presently available. For instance, the processor 130 may select the transmission opportunity associated with the fastest network path, the network path with the least traffic or interference, the network path that permits the largest sub-packets, etc.

At block 630, the transmitter 105 may begin to generate sub-packets from the packet selected at block 615. The sub-packet may include a payload with the amount of data that may be transmitted in accordance with the transmission opportunity selected at block 625.

At block 635, the transmitter 105 may transmit the sub-packet generated at block 630 over the network path associated with the transmission opportunity selected at block 625.

At decision block 640, the transmitter 105 may determine whether a higher-priority packet has been queued in the buffer 120. If so, the process 600 may return to block 615 so that the higher-priority packet can be selected and processed.

If no higher-priority packet has been queued, the process 600 may continue at block 645.

At decision block 645, the transmitter 105 may determine whether the packet selected at block 615 has been sent in its entirety via the sub-packets. If the packet selected at block 615 has been sent in its entirety, the process 600 may proceed to block 615 so that a new packet can be selected and processed. If the packet selected at block 615 has not been sent in its entirety, the process 600 may return to block 620 so that the present transmission opportunities can be evaluated and appropriate sub-packets can be generated and transmitted in accordance with one of the transmission opportunities.

The process 600 may continue until the transmitter 105 is turned off, disconnected from the network paths 115, or is otherwise no longer able to communicate via the network paths 115.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A transmitter comprising:
   a buffer; and
   a computing device having a processor and a non-transitory data storage medium, wherein the computing device is programmed to generate at least a first sub-packet and a second sub-packet from a packet stored in the buffer and identify a plurality of transmission opportunities available for transmitting the first sub-packet and identify a plurality of transmission opportunities available for transmitting the second sub-packet,
   wherein each transmission opportunity is associated with one of a plurality of networks and wherein each transmission opportunity defines a different length of transmission time and at least one of a different time slot and a different amount of data transmission capacity available to transmit one of the first and second sub-packets over one of the plurality of networks, and
   wherein the computing device is further programmed to select a first transmission opportunity from among the plurality of transmission opportunities available for transmitting the first sub-packet and transmit the first sub-packet over the network associated with the first transmission opportunity, and
   wherein the computing device is further programmed to select a second transmission opportunity from among the plurality of transmission opportunities available for transmitting the second sub-packet and transmit the second sub-packet over the network associated with the second transmission opportunity.

2. The transmitter of claim 1, wherein the first transmission opportunity and the second transmission opportunity are associated with different networks.

3. The transmitter of claim 1, wherein the computing device is programmed to transmit the first sub-packet and the second sub-packet in a predetermined order.

4. The transmitter of claim 1, wherein the computing device is programmed to assign a first priority to the first sub-packet and a second priority to the second sub-packet, wherein the computing device is programmed to transmit the first sub-packet and the second sub-packet according to the first priority and the second priority.

5. The transmitter of claim 4, wherein the second priority is higher than the first priority and the computing device is programmed to transmit the second sub-packet before the first sub-packet.

6. The transmitter of claim 1, wherein one of the plurality of networks includes a scrambled coded multiple access (SCMA) network.

7. The transmitter of claim 1, wherein the computing device is programmed to transmit the first sub-packet over a first network path associated with the first transmission opportunity and transmit the second sub-packet over a second network path associated with the second transmission opportunity after transmitting the first sub-packet over the first network path.

8. The transmitter of claim 7, wherein the computing device is programmed to generate the first sub-packet according to a communication protocol associated with the first network path and further programmed to generate the second sub-packet according to a communication protocol associated with the second network path after generating the first sub-packet.

9. The transmitter of claim 8, wherein the computing device is programmed to identify the plurality of transmission opportunities available for transmitting the second sub-packet after transmitting the first sub-packet over the first network path.

10. The transmitter of claim 8, wherein the computing device is programmed to generate the first sub-packet after identifying the plurality of transmission opportunities available for transmitting the first sub-packet.

11. The transmitter of claim 10, wherein the computing device is programmed to generate the second sub-packet after identifying the plurality of transmission opportunities available for transmitting the second sub-packet.

12. A telecommunications system comprising:
    a transmitter programmed to queue packets and generate at least a first sub-packet and a second sub-packet from one of the packets, and wherein the transmitter is further programmed to:
    identify a plurality of transmission opportunities for each of the first sub-packet and the second sub-packet, wherein each transmission opportunity is associated with one of a plurality of networks and wherein each transmission opportunity defines a different length of transmission time and at least one of a different time slot and a different amount of data transmission capacity available to transmit one of the first sub-packet and the second sub-packet,
    select among the plurality of transmission opportunities, wherein selecting among the plurality of transmission opportunities includes selecting a first transmission opportunity from among the plurality of transmission opportunities available for transmitting the first sub-packet and selecting a second transmission opportunity from among the plurality of transmission opportunities available for transmitting the second sub-packet, and
    transmit the first sub-packet and the second sub-packet over the networks associated with the first transmission opportunity and the second transmission opportunity, respectively; and
    a receiver programmed to receive the first sub-packet and the second sub-packet transmitted over the networks associated with the first transmission opportunity and the second transmission opportunity, respectively.

13. The telecommunications system of claim 12, wherein the transmitter is programmed to transmit the first sub-packet and the second sub-packet in a predetermined order.

14. The telecommunications system of claim 13, wherein the transmitter is programmed to assign a first priority to the first sub-packet and a second priority to the second sub-packet and transmit the first sub-packet and the second sub-packet according to the first priority and the second priority.

15. The telecommunications system of claim 12, wherein one of the plurality of networks includes a scrambled coded multiple access (SCMA) network, and wherein the transmitter and receiver are programmed to communicate over the SCMA network in addition to at least one other network.

16. A method comprising:
queuing a packet in a buffer;
generating a first sub-packet and a second sub-packet, from the packet queued in the buffer;
identifying a plurality of transmission opportunities for each of the first sub-packet and the second sub-packet, wherein each transmission opportunity is associated with one of a plurality of networks and wherein each transmission opportunity defines a different length of transmission time and at least one of a different time slot and a different amount of data transmission capacity available to transmit one of the first sub-packet and the second sub-packet;
selecting among the plurality of transmission opportunities, wherein selecting among the plurality of transmission opportunities includes selecting a first transmission opportunity from among the plurality of transmission opportunities available for transmitting the first sub-packet and selecting a second transmission opportunity from among the plurality of transmission opportunities available for transmitting the second sub-packet; and
transmitting the first sub-packet and the second sub-packet over the networks associated with the first transmission opportunity and the second transmission opportunity, respectively.

17. The method of claim 16, further comprising:
determining a first priority associated with the first sub-packet;
determining a second priority associated with the second sub-packet; and
transmitting the first sub-packet and the second sub-packet according to the first priority and the second priority.

* * * * *